United States Patent
Kefalas et al.

(10) Patent No.: US 7,366,512 B1
(45) Date of Patent: Apr. 29, 2008

(54) NOTIFICATION METHOD AND DEVICE FOR SERVICE PROVIDERS

(75) Inventors: Anastasios Kefalas, Alpharetta, GA (US); Jonathan Lin, Arlington, MA (US)

(73) Assignee: AT & T Mobiliity II LLC, Atlanta, GA (US)

( * ) Notice: Subject to any disclaimer, the term of this patent is extended or adjusted under 35 U.S.C. 154(b) by 113 days.

(21) Appl. No.: 11/100,427

(22) Filed: Apr. 7, 2005

(51) Int. Cl.
 - H04Q 7/20 (2006.01)
 - H04Q 7/22 (2006.01)
 - H04M 1/00 (2006.01)
 - H04B 1/38 (2006.01)
 - G06Q 50/00 (2006.01)

(52) U.S. Cl. ............... 455/435.2; 455/414.1; 455/466; 455/550.1; 455/556.2; 455/567; 705/15

(58) Field of Classification Search .. 455/456.1–456.6, 455/412.1, 412.2, 413, 433, 2.01, 461, 3.01, 455/463, 3.05–3.06, 454, 414.1–414.4, 415–417, 455/418–421, 432.3, 435.1–435.3, 436–451, 455/452.1, 452.2, 458–459, 560–561, 566–567, 455/466, 41.2–41.3, 66.1, 403, 67.7, 406, 455/517, 507–508, 522.1, 550.1, 556.2; 186/35–41; 709/206, 226, 202–203; 705/15–18, 75–76, 705/28–29; 710/15–19; 340/286.07, 286.08, 340/286.09

See application file for complete search history.

(56) References Cited

U.S. PATENT DOCUMENTS 5,819,180 A * 10/1998 Alperovich et al. ........ 455/465
7,035,731 B2 * 4/2006 Smith ........................ 701/207
2002/0095312 A1 * 7/2002 Wheat ............................ 705/1
2002/0133418 A1 * 9/2002 Hammond et al. ........... 705/26
2003/0023690 A1 * 1/2003 Lohtia ........................ 709/206
2003/0078793 A1 * 4/2003 Toth ............................... 705/1
2003/0167204 A1 * 9/2003 Makipaa ...................... 705/14
2004/0003048 A1 * 1/2004 Stillman et al. ............ 709/207
2004/0015593 A1 * 1/2004 Krembs et al. ............. 709/228
2004/0044578 A1 * 3/2004 Kim et al. ................... 705/15
2004/0068481 A1 * 4/2004 Seshadri et al. .............. 707/1
2004/0103158 A1 * 5/2004 Vella et al. ................. 709/206
2004/0107170 A1 * 6/2004 Labrou et al. ............... 705/64
2004/0128359 A1 * 7/2004 Horvitz et al. ............. 709/207
2005/0114185 A1 * 5/2005 Rodriguez et al. ............ 705/5
2005/0132016 A1 * 6/2005 Boone ........................ 709/207
2005/0221806 A1 * 10/2005 Sengupta et al. ......... 455/414.1
2006/0004924 A1 * 1/2006 Trossen ..................... 709/228
2006/0068787 A1 * 3/2006 Deshpande et al. ....... 455/435.3
2006/0154650 A1 * 7/2006 Sherman et al. ......... 455/412.2

* cited by examiner

*Primary Examiner*—Meless Zewdu
(74) *Attorney, Agent, or Firm*—Gardner Groff Greenwald & Villanueva PC (57) ABSTRACT

A customer is alerted to the availability or completion of service by a service provider through communication with a wireless terminal of the customer. The terminal has an assigned identification number and a control channel, and as a first step, the identification number (e.g., telephone number) of the wireless terminal is registered with the service provider. When service for the customer is available or completed, a determination is made of whether the wireless terminal is active. If active, the customer is alerted to the availability or completion of the service, preferably using a preformatted message transmitted to the wireless terminal over the control channel. In one example, the service provider is a restaurant and the customer is alerted to the availability of a table.

19 Claims, 6 Drawing Sheets

Fig. 8

NOTIFICATION METHOD AND DEVICE FOR SERVICE PROVIDERS

FIELD OF THE INVENTION

The present invention relates to methods and devices for notifying customers or patrons that a service is available or has been completed, and for enhancing marketing efforts and initiatives relative to such customers.

BACKGROUND OF THE INVENTION

Although, as will appear, the present invention has application in different fields, one exemplary use that is helpful in understanding the invention is in restaurants. Currently, many restaurants employ a coaster/paging device for indicating to a customer or patron that his or her table is ready. The coaster device is issued to the customer when the customer enters the restaurant and is taken by the customer to a waiting area in the restaurant such as a lounge area or a bar. Typically, the coaster device is caused to light up (e.g., one or more lights are remotely activated by restaurant personnel so as to blink on and off/vibrate), when a table is ready, thereby alerting the customer. While this paging technique can be effective, the use of coaster devices requires a substantial investment in the devices themselves, and the range provided is limited, i.e., the customer must stay close to eating area and cannot, e.g., leave the restaurant.

The range limitation can be a problem for the restaurant when there is a long wait for a table in that the customer may simply prefer not to sit around and wait for a table, and thus simply may go to a different restaurant. On the other hand, an approach wherein the customer would leave the restaurant and simply call in periodically to ascertain the availability of a table is essentially unworkable for a number of reasons. These reasons include the inconvenience for both the customer and the restaurant (e.g., continually taking such calls and checking on the tables could be quite time consuming for a large and/or busy restaurant). Moreover, once the customer leaves the restaurant, there would be no guarantee that he or she would call back in so that it would be difficult for the restaurant to hold a table.

Another concern with paging in general is the premium placed by some restaurants on maintaining a relatively quiet ambiance in various areas of the restaurant including the eating area and, as a corollary, on the courteous use of mobile telephones in these areas so as not to disturb other diners. Given these concerns, it is preferable that any paging system of the type discussed above not add to these problems.

SUMMARY OF THE INVENTION

Generally speaking, in accordance with the present invention, there are provided improved methods and devices for use by a service provided such as a restaurant, repair shop, movie theater and the like alerting a customer or patron that a service is available or has been completed. The methods and devices essentially eliminate the problems discussed above with respect to conventional notification devices such as coaster/paging devices and, in addition in accordance with one preferred embodiment, provide a vehicle for enhanced marketing efforts and initiatives directed to the customer or patron.

In accordance with a first aspect of the invention, there is provided a method for alerting a customer to the availability or completion of service by a service provider using a wireless terminal of the customer having an identifier, the method comprising the steps of:

registering the identifier of the wireless terminal with the service provider using a registration device; and when service for the customer is available or completed, using a wireless system in determining whether the wireless terminal is active and, if active, alerting the customer of the availability or completion of the service using a message transmitted to the wireless terminal over the wireless system. Messages can be transmitted wirelessly using various methods such as IR, Bluetooth, and SMS or WAP Push.

In one important embodiment, the service provider is a restaurant and the customer is alerted to the availability of restaurant service. In one implementation, two way communication is established between the customer and the restaurant, the availability of restaurant service comprises the availability of a reserved table at the restaurant, and the customer, upon being alerted to the availability of the reserved table of the restaurant, can make or confirm a reservation for the table. Advantageously, the customer is provided with a menu over a wireless communication channel and can pre-order prior to being seated in the restaurant or view what specials the restaurant is promoting that day. In an alternative embodiment, the customer is directed to a website for the restaurant that includes a menu, so that the customer can pre-order from the website menu prior to being seated in the restaurant. Other options would be for a customer to wirelessly provide the restaurant with dining preferences such as the number of people in the party, smoking or non-smoking, indoors or outdoors seating, and/or pre-meal drink orders.

In another important embodiment the service provider is a repair shop and the customer is alerted as to completion of a repair job. In one implementation, two-way communication is established between the customer and the repair shop, and the customer, upon being alerted as to the completion of a repair job, can indicate a preferred pick-up time and/or payment method preference to the repair shop.

In yet another important embodiment, the service provider is a movie theater and the customer is alerted as to the availability for viewing of at least one movie. Preferably, the customer is further provided with information as to viewing times of at least one movie and at least one further movie.

In a further important implementation, the customer is enabled to opt into wirelessly receiving marketing information provided by the service provider. Preferably, the marketing information provided includes a buying incentive associated with purchasing services from the service provider. In one embodiment, the buying incentive includes a discount coupon. In another embodiment, the buying incentive includes a mobile gift certificate.

As indicated above, in one implementation of the invention, two-way communication is established between the customer and the service provider. In one embodiment of this implementation of the invention, the two-way communication comprises wireless voice communication. In another embodiment, a data session is set up between the wireless terminal and a further wireless terminal associated with the service provider used to alert the customer as to the availability or completion of the service, and packetized digital data is transmitted between the terminals.

In one preferred embodiment, the customer is alerted using a Short Messaging Service (SMS) message. In another preferred embodiment, the customer is alerted using Bluetooth messaging. In yet another preferred embodiment, the customer is alerted using Infrared (IR) transference messaging. In a further embodiment, the customer is alerted using Wireless Application Protocol (WAP) Push messaging.

According to a further important feature of the invention, where the customer terminal is suitably equipped, different modes of messaging are used depending on the circumstances. In one preferred embodiment, the wireless device of the customer and a controller of the service provider are both Bluetooth-enabled, registering of the wireless terminal comprises pairing of the wireless terminal and the controller and if an attempt is first made to communicate using Bluetooth messaging, and this Bluetooth messaging fails, a further messaging mode is used in alerting the customer. In one preferred embodiment, the further mode of messaging comprises WAP Push messaging. In an alternative preferred embodiment, the further mode of messaging comprises SMS Push messaging.

In accordance with a further aspect of the invention, there is provided a device for alerting a customer to the availability or completion of service by a service provider using a customer wireless terminal having an identifier, the device comprising:

registering means for registering the identifier of the wireless terminal with the service provider; and customer alerting means, for use when service for the customer is available or completed and the customer is to be alerted, for determining whether the wireless terminal is active and available to receive messages and for, if the wireless terminal is active and available to receive messages, alerting the customer of the availability or completion of the service by providing for transmission of a message to the wireless terminal.

In one preferred embodiment, the registering means comprises part of a standalone controller located at the service provider.

According to another aspect of the invention, there is provided a method for alerting a customer to the availability or completion of service by a service provider using a customer wireless terminal having an assigned identifier and a control channel, said method comprising the steps of:

registering the identifier of the wireless terminal with the service provider; and when service for the customer is available or completed, using a wireless system in determining whether the wireless terminal is active and, if active, using the wireless system alerting the customer of the availability or completion of the service by transmitting a message to the wireless terminal over the control channel of the wireless terminal.

In one preferred embodiment, the message transmitted is a preformatted message.

In another important implementation, the service provider is a restaurant and the customer is alerted to the availability of restaurant service.

In one preferred embodiment, two way communication is established between the customer and the service provider.

Further features and advantages of the present invention will be set forth in, or apparent from, the detailed description of preferred embodiments thereof which follows.

DETAILED DESCRIPTION OF THE PRESENT EMBODIMENT

Figure 1:
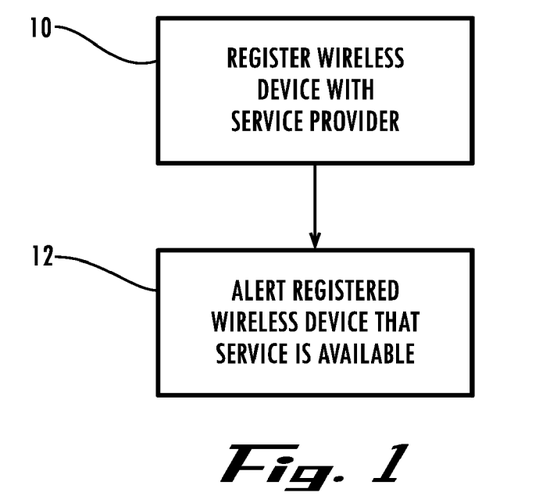
FIG. 1 is a flow diagram of a method in accordance with one embodiment of the invention.

Referring to FIG. 1, in accordance with one aspect of the invention, a method is provided wherein, in a first step 10, a customer or patron registers his or her wireless device or terminal with the service provider. Although the wireless device would typically be a conventional mobile cellular telephone, essentially any mobile wireless device or terminal can be used (PDA, laptop, or the like) which has an "address" or other identifier that can be contacted and includes a control channel or is otherwise capable of receiving a message or command. As discussed below, in embodiments wherein Bluetooth or Wi-Fi is used to transmit messages or commands, "registration" consists of "pairing" of the Bluetooth enabled wireless device and the Bluetooth enabled device of the service provider and storing of the pairing, while, with Wi-Fi, the name of the customer wireless device or a default name is stored.

In a second step 12, the service provider causes a message to be sent to the wireless device, alerting the customer that the service is available or the service contracted for has been completed. In one important embodiment, the message is a SMS (Short Messaging Service) message transmitted over the control channel of the wireless device, but as indicated above, other messaging, such as Bluetooth messaging, IR transference, and/or the sending of a WAP Push message, can also be used.

In one important exemplary embodiment, the service provider is a restaurant as discussed above, and the message would indicate to the customer that his or her table is ready. Other important applications include a vehicle repair shop wherein the message would indicate, e.g., that your vehicle (e.g., car or truck) is ready.

Another important application is where the service provider is a movie theater, and, in particular, a multiplex theater wherein several different movies might be of interest to a patron, and the patron is, e.g., advised of the availability of a particular movie (i.e., whether the movie is sold out) at a particular starting time, and, if the particular movie is sold out, the availability of other movies, their starting times. Thus, in this application, the service that would be available would be the showing of a particular movie.

Considering the restaurant application in more detail, the customer, immediately upon coming into the restaurant, or after being informed of the estimated waiting time for a table and not wishing to wait in the restaurant, would register his or her wireless telephone or other wireless device with the restaurant. In particular, the wireless address (e.g., the telephone number or internet protocol (IP) address of the wireless telephone) would be entered into a suitable device described below in connection with FIG. 2. The customer could then leave the restaurant and would be free to attend to other matters during the waiting time period. When a suitable table becomes available, the service provider of step 1, i.e., the person designated by the restaurant to attend to the matter, would alert the customer by pressing a button associated with device or typing out a message on a keypad associated with the device that would cause, in this example, a SMS (Short Message Service) message to be sent over the control channel of the wireless device. No voice communication would be required and the wireless device, after being initially contacted through its address (e.g., its telephone number or internet address), would be directly paged with the SMS message indicating the availability of the table.

According to a further aspect of the invention, a restaurant or other service provider is able to send a Wireless Application Protocol (WAP) Push message to a customer who has "opted into" receiving mobile marketing information, i.e., has signed up for or has otherwise indicated a willingness to receive, such mobile marketing information generated by a service provider (e.g., the restaurant). In one embodiment, the customer receives the WAP Push message, and clicks on a link providing an award, prize or other buying incentive associated with the service provided. In an important implementation, the service provider would provide the customer with either a mobile certificate or a discount coupon. The WAP Push message can also take the customer to a WAP desk, hosted either by a wireless provider or a content provider, which would provide additional information (e.g., "today's specials" in the case of a restaurant). The desk can also serve up an additional functionality such as allowing the customer to pre-submit his or her order, provide their table preference, confirm/cancel a reservation and the like.

In a preferred embodiment wherein a wireless telephone is registered in order to make initial contact, the restaurant device would connect into a landline telephone and the restaurant personnel would simply dial the wireless telephone number and, using one of the techniques described above, submit a specially formulated message to the wireless handset of the customer. As indicated, in one important implementation a SMS message is used and the message is preferably sent over the control channel of the wireless terminal.

It will be appreciated that in other applications, such as use of the method of the invention in connection with an automobile repair shop or the like, a short message such as "your car is ready" would be sent. This would be particularly useful in a situation where the repair in question is not expected to take more than, e.g., two or three hours, and would free up the car owner to, e.g., go shopping in the area, rather than wait at the repair shop. Moreover, the car owner would not have to check back periodically to see if the car was indeed ready.

In embodiments such as those discussed below wherein two-way communication is established, the customer, once being informed that the job has been completed (e.g., that the car is ready), can then respond with a preferred time of pickup and would also be served up with the ability to approve a mobile payment, either using a credit card on file, or by manually providing banking information over a Secure Mobile Connection (MTTPS).

Figure 2:
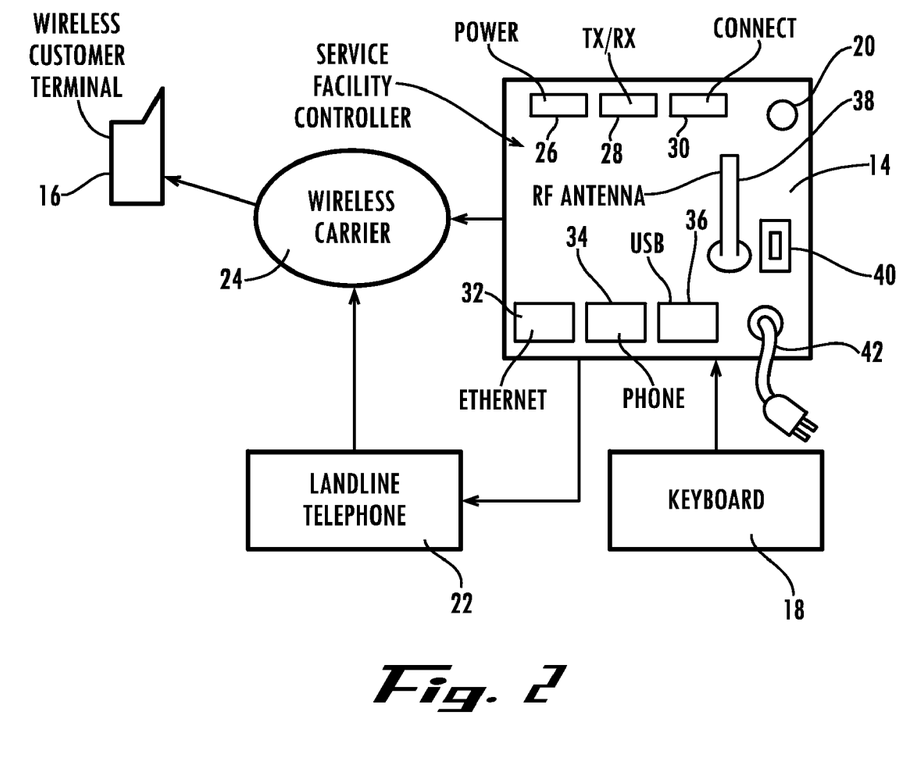
FIG. 2 is a block diagram of a device and system in accordance with a preferred embodiment of the invention.

Referring to FIG. 2, there is shown a schematic diagram of one preferred embodiment of the system hardware that can be used in implementing the invention. As discussed above, a service facility controller or control device 14 is provided which enables registration of the address or other identifier (e.g., a telephone number) of a wireless customer terminal indicated at 16. Device 14 can take a number of different forms and preferably includes a keyboard or keypad 18 which permits typing in of the address to be registered as well as, in one embodiment not employing a preformatted message, typing out the "service" message (e.g., "your table is ready"). As indicated above, in an alternative embodiment, a simple pushbutton 20 or the like, associated with control device 14, can also be used for sending a preformulated or specially formatted message.

As described above, in one important embodiment, control device 14 connects into a landline telephone 22, so as to permit the service provider to dial the telephone number of the wireless device 16 and, through a wireless carrier 24, submit the specially formatted "service" message to the wireless device (e.g., handset) 16, indicating, e.g., that a table is ready or that other service has been completed.

As shown in FIG. 2, controller or control device 14 may be a standalone device but, as indicated above, can also be part of an existing computer-based system. In the illustrated embodiment, controller 14 includes "Power," "TX/RX" (transmitter-receiver) and "connect" ports, denoted 26, 28 and 30, respectively, as well as Ethernet, Phone and USB (Universal Serial Bus) ports, denoted 32, 34 and 36, respectively. Controller 14 further includes a radio frequency (RF) antenna 38, an on-off power control switch 40 and an electrical power cord 42 which enables the controller 14 to be plugged into a standard wall outlet or the like.

It will be appreciated that the illustrated embodiment of FIG. 2 is merely exemplary, and different embodiments may include only some of these features or may include other features discussed below. In the latter regard, for example, the device 14 may be provided with a Bluetooth capability in accordance with a further aspect of the invention discussed hereinafter. It will also be appreciated that the particular construction shown is highly schematic and while ports 26, 28 and 30, on the one hand, and ports 32, 34 and 36, on the other hand, are shown on the same side for ease of illustrations, these ports would preferably be located on opposite sides and may, of course, be arranged in different combinations Referring to FIG. 3, a high level block diagram of the overall system is shown. In this embodiment, a carrier customer site, i.e., the site at which the service provider (e.g., restaurant) is located, is indicated at 44 and includes a server 46 which, as shown, may be a conventional server or a dedicated unit similar to controller 14 of FIG. 2. The carrier customer site is connected through an IP connection 48 (whether a private circuit or a VPN) to a carrier network 50. The carrier network 50 includes a server which communicates with a serving mobile switching center (SMSC) 52 using SMPP (short or simple message peer to peer or short message point to point) messaging, and with a mobile access gateway (MAG) 54 using HTTP. A cell tower is indicated at 56 and a wireless terminal at 58. This system shown in FIG. 3 is basically conventional apart from the controller 46 when a dedicated standalone unit is used and enables wireless communication between wireless terminal 60 and controller 46 in providing the messaging, and, in some embodiments, the further communication, described above and also further discussed below.

Figure 3:
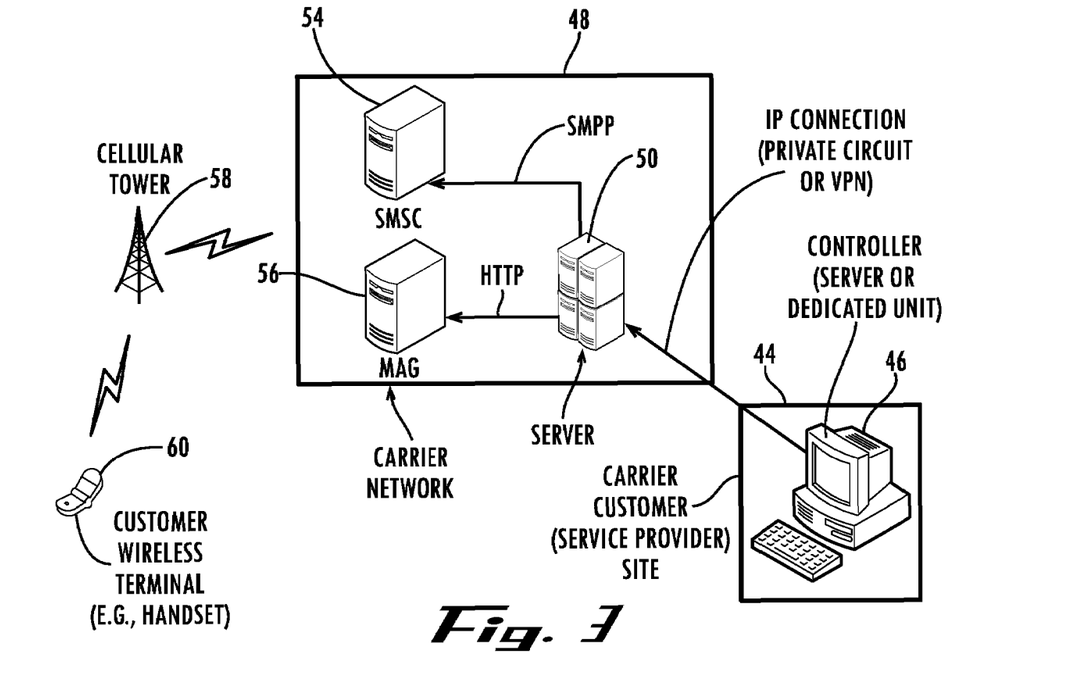
FIG. 3 is a schematic diagram of a system in which a device according to the invention is incorporated and which is used in carrying out an embodiment of the method of the invention.
Figure 4:
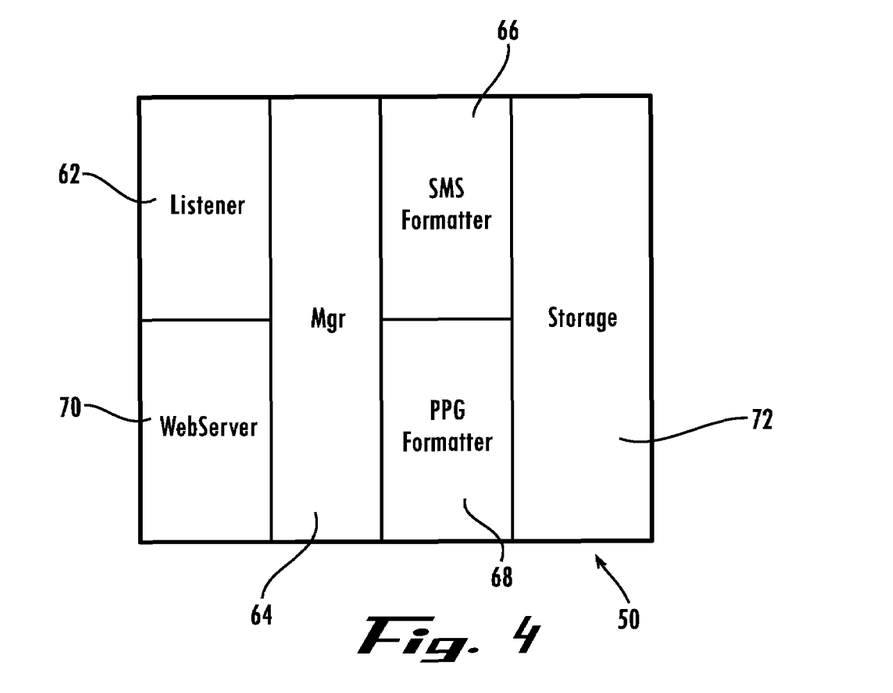
FIG. 4 is a block diagram of an application server that can be used in carrying out a further embodiment of the invention.

Referring to FIG. 4, there is shown a system level schematic diagram of the application server 50 of the carrier network 48 of FIG. 3. Server 50 includes a listener 62 which receives requests from, e.g., the standalone unit 46 of FIG. 3 (or a PC or the like) and a manager 64 which controls routing of, and in some embodiments the verbiage for, the message configured by the customer of the carrier network, i.e., the provider of services to its customers.

A SMS formatter 66 formats requests from listener 62 as an SMS message and sends the request to a SMSC/device (corresponding, e.g., to SMSC 54 of FIG. 3). A PPG formatter 68 also formats requests from listener 62 but formats the request as a WAP Push message, and also sends the request to the SMSC/device (again, corresponding, e.g., to SMSC 54 of FIG. 3).

A web server 70 is used to support content if the provider of service does not have such support. Storage 72 is also provided as part of server 50.

Figure 5:
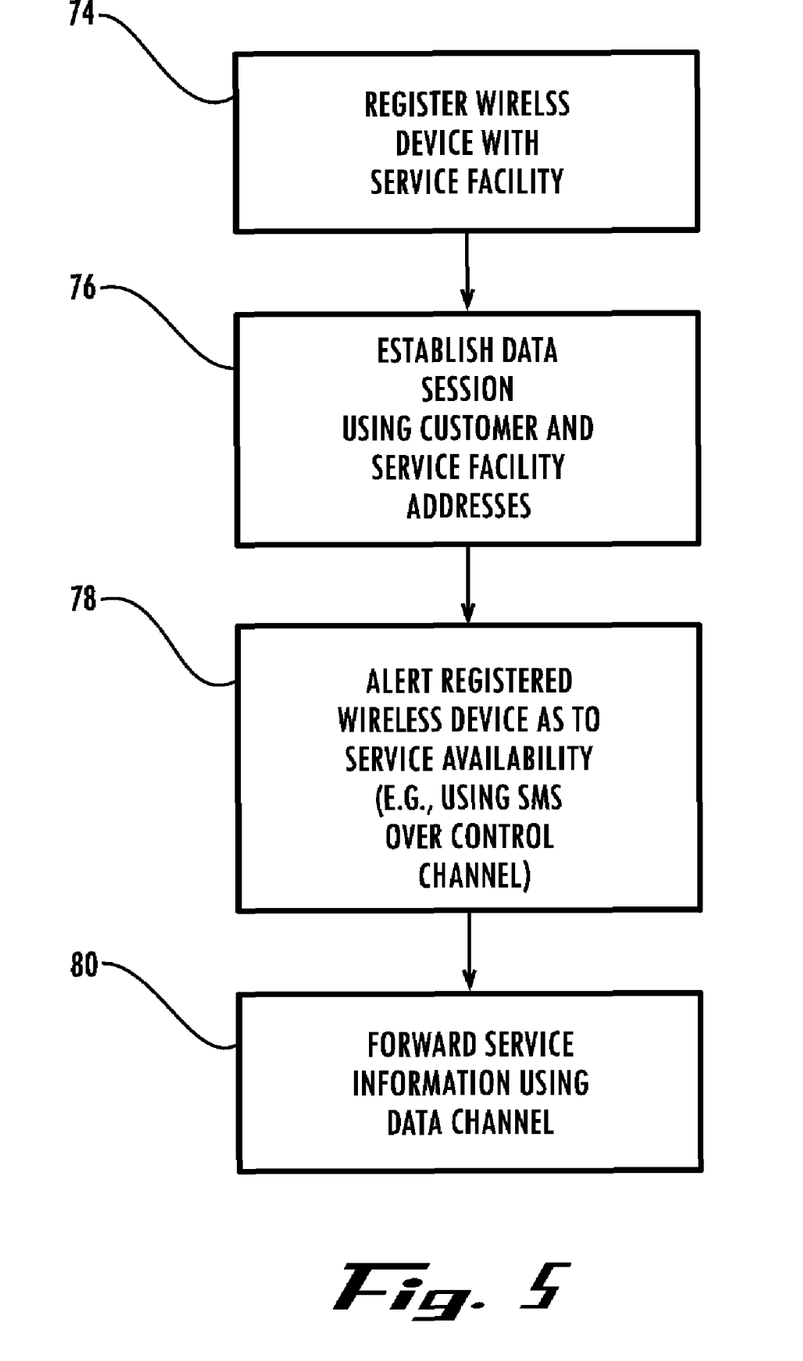
FIG. 5 is a flow diagram of a method in accordance with a further embodiment of the invention.

Referring to FIG. 5, a method in accordance with a further embodiment of the invention is illustrated. In this embodiment, registration of a wireless device or terminal with the service facility takes place as described above, and is indicated by block or step 74. However, in this embodiment, as indicated by block 76, a data session is established using the registered address of, or another identifier associated with, the customer, i.e., the address or other identifier of the registered wireless device, and the address or other identifier of the service provider.

In one implementation of this embodiment, the registered wireless device is, as indicated by block 78, alerted as to service availability in the same way as discussed above, and, in one preferred embodiment, through the use of a SMS message sent over the control channel of the device. However, by establishing data session, additional service information can be sent over a data channel, as indicated by block 80. Thus, in the restaurant embodiment discussed above, a menu could be sent so that the customer would be able to order a meal from the menu, and the food could be prepared, and would perhaps be ready to serve, when the customer arrives back at the restaurant. In an alternative implementation of this embodiment, the customer is referred to a website for the restaurant that includes a menu, and the customer is able to pre-order in this way.

As indicated above, short range messaging such as Bluetooth messaging can be used in carrying out embodiments of the method of the invention wherein both the customer wireless device and the service provider controller are Bluetooth enabled. This embodiment is particularly useful in, e.g., a restaurant setting wherein the customer remains close by, e.g., at the bar or out on a patio. In this regard, the generally accepted standard range for Bluetooth is about thirty feet although Bluetooth systems with a substantially longer range are being developed.

Figure 6:
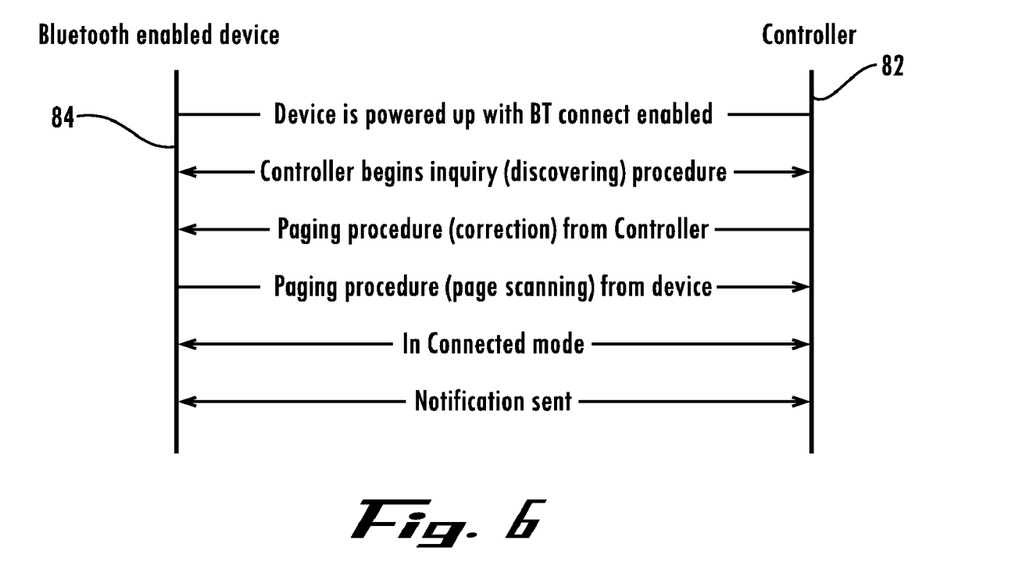
FIG. 6 is a tall flow diagram used in explanation of an embodiment of the invention using Bluetooth notification.

Referring to FIG. 6, there is shown a use diagram showing the signaling between the service provider controller, indicated at 82, and a Bluetooth-enabled customer device, indicated at 84. It should be noted that FIG. 5 is derived from the Bluetooth Spec v1.2 (Bluetooth SIG) and that the basic content of FIG. 5 is conventional.

As indicated in FIG. 6, as a first step in the notification or messaging process, the customer wireless device is powered up with the Bluetooth connection enabled. The service provider controller 82 then begins the inquiry (i.e., the searching or discovering procedure). Next, as illustrated, when the wireless device 84 is discovered, a paging procedure is carried out wherein a connection signal is transmitted from the controller 82 and a page scanning signal is transmitted from the device 84. As indicated by the next step, connection is thus established, i.e., the device 84 and the controller 82 are in the connected mode, and, as shown, the relevant notification or message can be sent.

In accordance with a further aspect of the invention, different types of notification or messaging can be used depending on the capabilities of the customer wireless device or terminal and the controller. In this regard, if the two devices are both suitably equipped, the system can, for example, begin by using Bluetooth if registered, i.e., if the devices have been paired, and if no connection is made (e.g., because the wireless terminal is out of range), then proceed with a further type of notification or messaging. For example, the system could next attempt to provide Wi-Fi messaging if a Wi-Fi identifier is registered and if this is unsuccessful, could then use WAP Push or SMS Push messaging.

Figure 7:
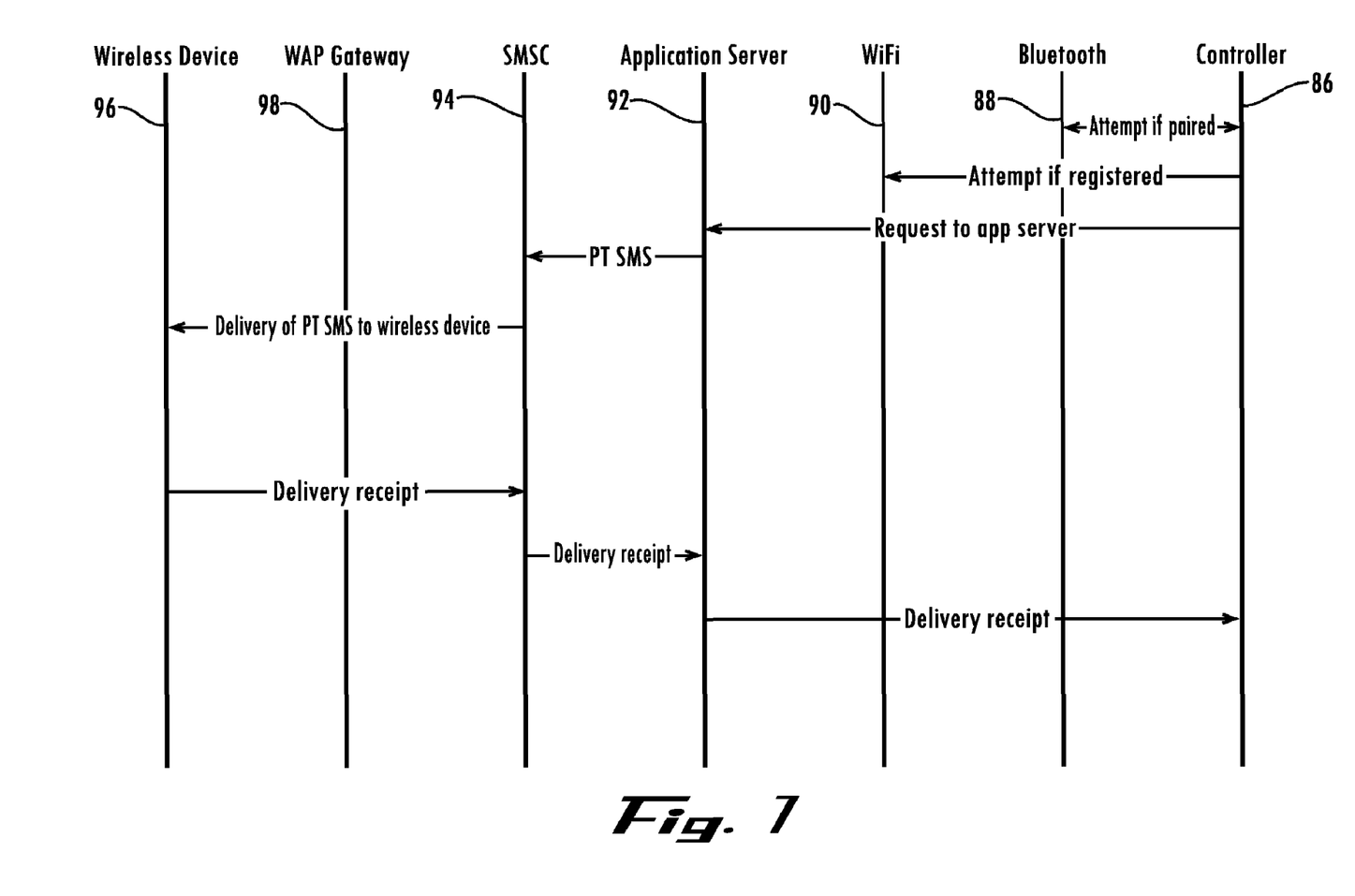
FIGS. 7 and 8 are call flow diagrams used in explanation of further embodiments of the invention.

Referring to FIG. 7, there is illustrated a call flow chart of the use case for a system such as just described which uses SMS Push Messaging as one mode of messaging. As shown, the controller 86 can first attempt a Bluetooth connection with a Bluetooth functionality 88 of the customer device if the controller 86 and Bluetooth functionality 88 are "registered," i.e., have been paired.

Next, as mentioned above, a Wi-Fi connection can be attempted with a Wi-Fi functionality 90 of the customer device if a Wi-Fi identifier has been registered. Such registration is usually achieved by registering a name (or a default name) or other identifier for the customer wireless device. At present, many customer wireless terminals may not have a Wi-Fi capability so that this particular messaging mode may be of less interest than others at this time.

If a connection is not made using one of the other modes, or if it is desired to skip or otherwise omit attempting these modes, a request can be sent by the controller 86 to the application server 92 (which can correspond, e.g., to application server 50 of FIGS. 3 and 4). The server 92 then sends a PT SMS message to the SMSC 94 which provides for delivery of the PT SMS message to the wireless device 96.

In the preferred embodiment under consideration, after the delivery of the SMS message to the wireless device 96, a delivery receipt will then be sent back to the SMSC 94 which then sends a delivery receipt to the application server 92 which, in turn, sends a delivery receipt to the controller 86.

Figure 8:
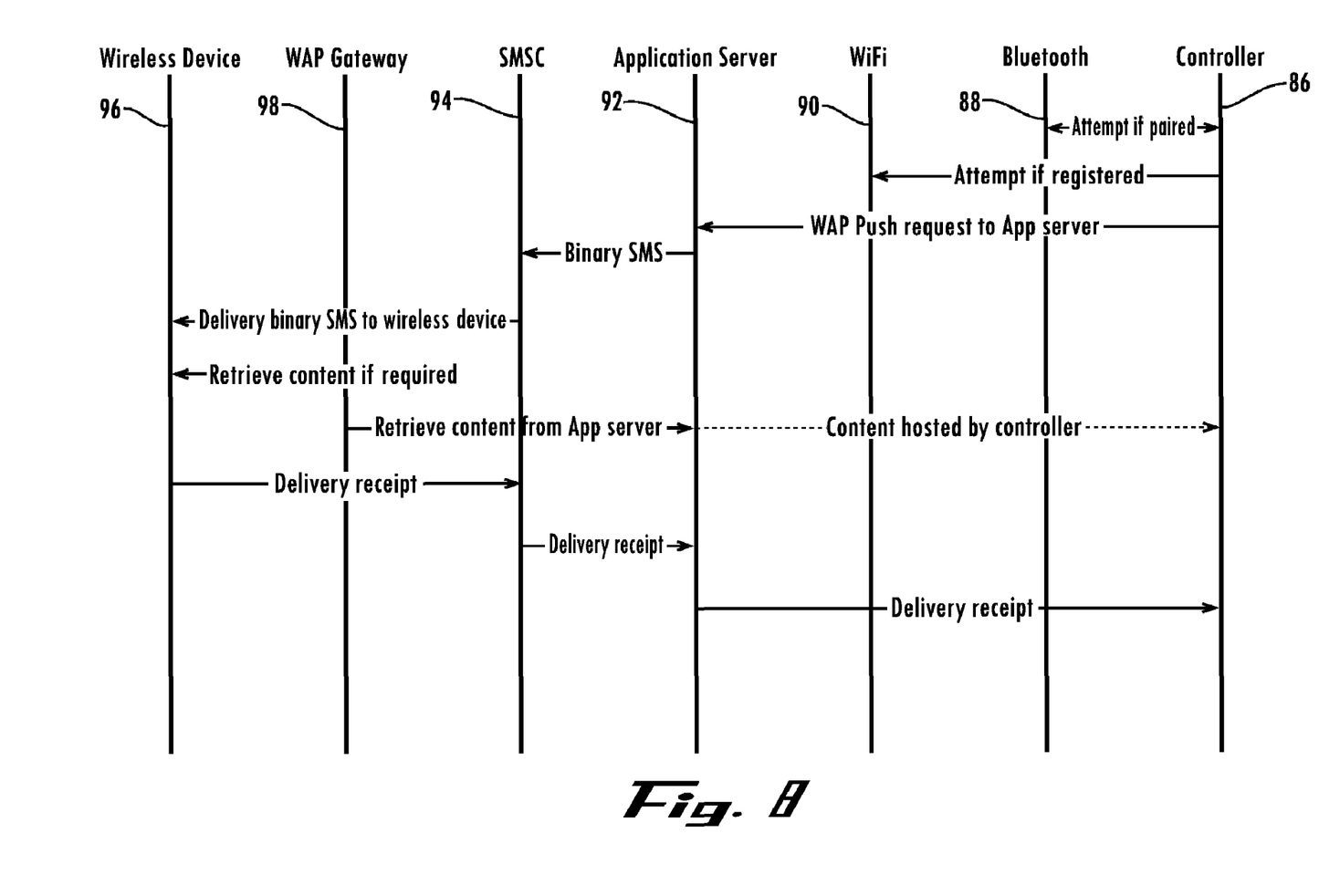

Referring to FIG. 8, a call flow chart is shown for a system using WAP Push as the mode of notification or messaging. FIG. 8 is similar to FIG. 7 and the same reference numerals are used therein. In this embodiment, after a WAP Push request is forwarded from the controller 86 to the application server 92, a binary SMS message is sent to the SMSC 94. The latter delivers the binary SMS to the wireless device 96. Content is retrieved from the WAP gateway 98 if required, and the WAP gateway 98 retrieves content from the application server as indicated in solid lines or the content can be hosted by the controller 86 as indicated in dashed lines. Delivery receipts are provided from the device 96 to the SMSC 94, from the SMSC 94 to the application server 92 and from the server 92 to the controller 86.

It is noted that the IMEI (International Mobile Equipment Identifier) or the equivalent can also be used as a trigger platform. The IMEI platform is used to assign a unique identifier to each mobile handset and this information could be used by the controller in identifying a particular handset.

In another embodiment that goes beyond two way messaging, the service facility control device (corresponding, e.g., to device 14 of FIG. 2) performs additional functions which are helpful to the customer and/or the service provider. For example, in the restaurant embodiment, the device can also register the customer name and send the name to the responsible waitress who would also carry a handless wireless device. The device carried by the waitress could also be used to take orders and, in the example under consideration, as the customer orders wirelessly, as part of the data session that has been set up, the ordered items can be input into the device held by the waitress. Further, a particular order can be registered as a favorite dish of the customer if the order is made frequently, using simple programming. Using this approach, a customer's food can be preordered or suggested by the waitress based on previous orders, so that, again, the food can be ready when the customer is seated. The handheld device used by the waitress can also be linked to the cash register so that a running tab or account can be maintained. The device can also be used to capture signatures or used to print out receipts on the spot.

It will be recognized that in the above description of preferred embodiments of the present invention, the service facility control device of the controller system, and other elements thereof, may be implemented on digital computing equipment, or the equivalent, through the use of computer programs, or the equivalent. Similarly, some aspects of the method of the invention may be incorporated in, or carried out by, executable instructions contained on a computer readable medium.

Although the invention has been described above in relation to preferred embodiments thereof, it will be understood by those skilled in the art that variations and modifications can be effected in these preferred embodiments without departing from the scope and spirit of the invention.

What is claimed is:

1. A method for alerting a customer to a current availability of a restaurant service by a service provider using a wireless terminal of the customer having an identifier, said method comprising the steps of:
    registering the identifier of the wireless terminal with the service provider using a registration device, the wireless terminal comprising a device for communicating voice and data with others via a wireless telecommunications network to which the customer subscribes;
    determining when the restaurant service for the customer is currently available, the restaurant service comprising the availability of a restaurant table at which to seat the customer;
    using the wireless telecommunications network in determining whether the wireless terminal is active and available to receive messages and, if active and available to receive messages and it is determined that the restaurant service is currently available for the customer, alerting the customer of the current availability of the restaurant service using a message transmitted to the wireless terminal over the wireless telecommunications network;
    receiving from the wireless terminal the customer's confirmation of a reservation for the table; and
    providing the wireless terminal with access to a menu so that the customer can preorder food and drink items via the wireless telecommunications network.

2. The method as claimed in claim 1 wherein the message transmitted is a preformatted message.

3. The method as claimed in claim 1 wherein the message is transmitted over a control channel of the wireless terminal.

4. The method as claimed in claim 1 wherein said registering step includes opting into receiving, wirelessly, marketing information provided by the service provider.

5. The method as claimed in claim 4 wherein the marketing information provided includes a buying incentive associated with purchasing services from the service provider.

6. The method as claimed in claim 5 wherein said buying incentive includes a discount coupon.

7. The method as claimed in claim 5 wherein said buying incentive includes a mobile certificate.

8. The method as claimed in claim 1 wherein a two-way communication is established between the customer and the service provider.

9. The method as claimed in claim 8 wherein said two-way communication comprises wireless voice communication.

10. The method as claimed in claim 8 wherein a data session is set up between the wireless terminal and a further wireless terminal associated with the service provider used to alert the customer as to the availability or completion of the service, and packetized digital data is transmitted between the wireless terminal and the further wireless terminal.

11. The method as claimed in claim 1 wherein the customer is alerted using a Short Messaging Service (SMS) message.

12. The method as claimed in claim 1 wherein the customer is alerted using Bluetooth messaging.

13. The method as claimed in claim 1 wherein the customer is alerted using Infrared (IR) transference messaging.

14. The method as claimed in claim 1 wherein the customer is alerted using Wireless Application Protocol (WAP) Push messaging.

15. The method as claimed in claim 1 wherein the wireless device of the customer and a controller of the service provider are both Bluetooth-enabled, wherein registering of the wireless terminal comprises pairing of the wireless terminal and the controller, and wherein it is determined if an attempt is first made to communicate using Bluetooth messaging, and if it is determined that said Bluetooth messaging fails, a further messaging mode is used in alerting the customer.

16. The method as claimed in claim 15 wherein said further mode of messaging comprises WAP Push messaging.

17. The method as claimed in claim 15 wherein said further mode of messaging comprises SMS Push messaging.

18. The device for alerting a customer to a current availability of a restaurant service by a service provider using a customer wireless terminal having an identifier, said device comprising:
    registering means for registering the identifier of the wireless terminal with the service provider;
    customer alerting means for determining when the restaurant service is currently available, the restaurant service comprising the availability of a restaurant table at which to seat the customer, for determining whether the wireless terminal is active and available to receive messages and for, if it is determined that the wireless terminal is active and available to receive the messages and that the restaurant service is currently available for the customer, alerting the customer of the current availability of the restaurant service by providing for transmission of a message to the wireless terminal;
    confirming means for receiving confirmation from the customer of a reservation for the table via the wireless device; and
    ordering means for receiving from the wireless terminal via the wireless telecommunications network an order for food and drink items.

19. A device as claimed in claim 18 wherein the registering means comprises a part of a standalone controller located at the service provider.

* * * * *